United States Patent
Bruggemann

(10) Patent No.: US 7,370,504 B2
(45) Date of Patent: May 13, 2008

(54) METHOD OF MAKING VARIABLE THICKNESS TUBULAR MEMBER FOR VEHICLES

(75) Inventor: Charles J. Bruggemann, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 398 days.

(21) Appl. No.: 11/255,733

(22) Filed: Oct. 21, 2005

(65) Prior Publication Data

US 2007/0090569 A1    Apr. 26, 2007

(51) Int. Cl.
B21D 22/10    (2006.01)
B21D 26/02    (2006.01)

(52) U.S. Cl. .......................... 72/61; 72/62; 72/370.22; 29/421.1

(58) Field of Classification Search ............... 72/54, 72/56, 58, 60, 61, 62, 370.1, 370.14, 370.22; 29/421.1
See application file for complete search history.

(56) References Cited

U.S. PATENT DOCUMENTS

| | | | | | |
|---|---|---|---|---|---|
| 3,487,668 | A | * | 1/1970 | Fuchs, Jr. | 72/61 |
| 4,282,734 | A | * | 8/1981 | Eddy | 72/370.22 |
| 4,418,556 | A | * | 12/1983 | Galle et al. | 72/62 |
| 4,502,308 | A | * | 3/1985 | Kelly | 72/58 |
| 4,557,128 | A | * | 12/1985 | Costabile | 29/421.1 |
| 5,524,466 | A | * | 6/1996 | Coe | 72/370.01 |
| 6,305,204 | B1 | * | 10/2001 | Tauzer | 72/62 |
| 6,758,077 | B2 | * | 7/2004 | Kaneko | 72/370.01 |
| 6,779,375 | B1 | * | 8/2004 | Alexoff | 72/370.02 |
| 6,845,552 | B2 | * | 1/2005 | Blough | 29/421.1 |
| 7,143,618 | B2 | * | 12/2006 | Ni | 72/61 |
| 7,225,541 | B2 | * | 6/2007 | Kubota | 72/370.14 |

* cited by examiner

Primary Examiner—David B Jones

(57) ABSTRACT

A method of making a variable thickness tubular member for a vehicle includes the steps of providing a tubular member and positioning a mandrel inside of the tubular member. The method also includes the steps of hydroforming the tubular member into a variable thickness tubular member having a variable wall thickness along its perimeter.

19 Claims, 3 Drawing Sheets

METHOD OF MAKING VARIABLE THICKNESS TUBULAR MEMBER FOR VEHICLES

TECHNICAL FIELD

The present invention relates generally to vehicles and, more specifically, to a method of making a variable thickness tubular member for a vehicle.

BACKGROUND OF THE INVENTION

It is known to construct tubular members for vehicles such as automotive vehicles. The tubular members are typically extruded from aluminum or magnesium and have a constant wall thickness. However, it is occasionally desirable to have a tubular member that has a wall thickness distribution around the perimeter of the tube, wherein the wall thickness varies.

It is also known that rollformers or tailored tube producers have made steel tubular members with a varying wall around the perimeter of the tubular member. To vary the wall thickness, strips of metal of differing gage have been welded together axially prior to joining the strips into a tubular form. However, these tubular members are costly due to the extra material and labor involved.

As a result, it is desirable to provide a variable thickness tubular member or blank to achieve a desirable wall thickness where needed for a structural member of a vehicle. It is also desirable to provide a hydroformed tubular member having a varying wall thickness around a perimeter thereof for a structural member of a vehicle. Therefore, there is a need in the art to provide a new cost effective method for manufacturing a variable thickness tubular member for a vehicle that meets these desires.

SUMMARY OF THE INVENTION

Accordingly, the present invention is a method of making a variable thickness tubular member for a vehicle. The method includes the steps of providing a tubular member and positioning a mandrel inside of the tubular member. The method also includes the steps of hydroforming the tubular member into a variable thickness tubular member having a variable wall thickness along its perimeter.

One advantage of the present invention is that a method of making a variable thickness tubular member is provided for a vehicle that is formed from a metal stretching process. Another advantage of the present invention is that the method can produce straight or bent hydroformed structural members with varying wall thickness from ductile materials not feasible to extrude. Yet another advantage of the present invention is that the method produces hydroformed structural members with varying wall thickness having reduced weight or increased weldability.

Other features and advantages of the present invention will be readily appreciated, as the same becomes better understood, after reading the subsequent description taken in conjunction with the accompanying drawings.

DESCRIPTION OF THE PREFERRED EMBODIMENT

Figure 1:
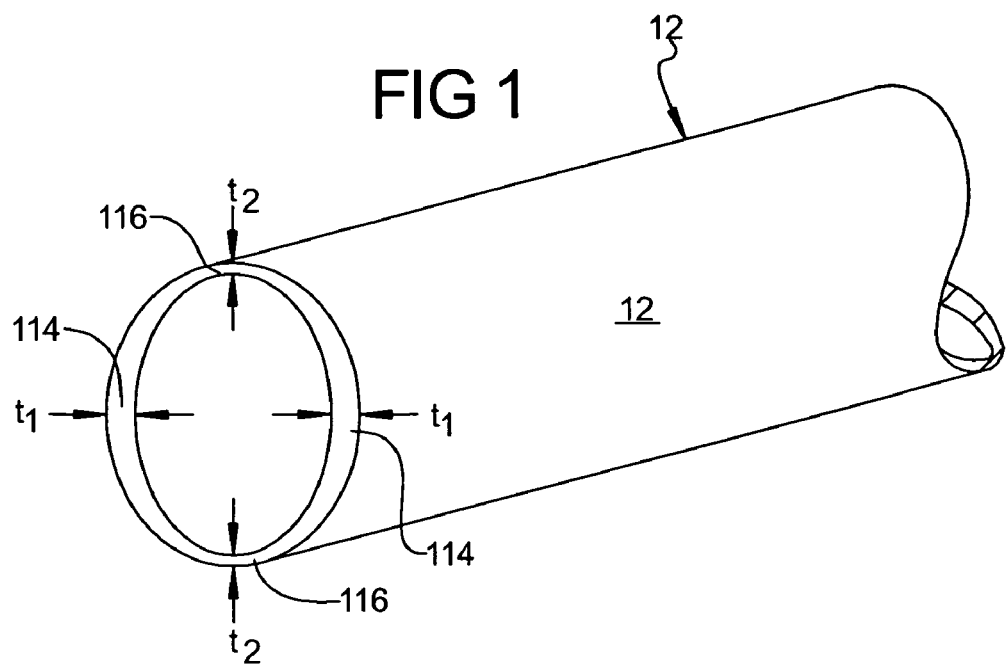
FIG. 1 is a perspective view of a variable thickness tubular member made by a method, according to the present invention.
Figure 2:
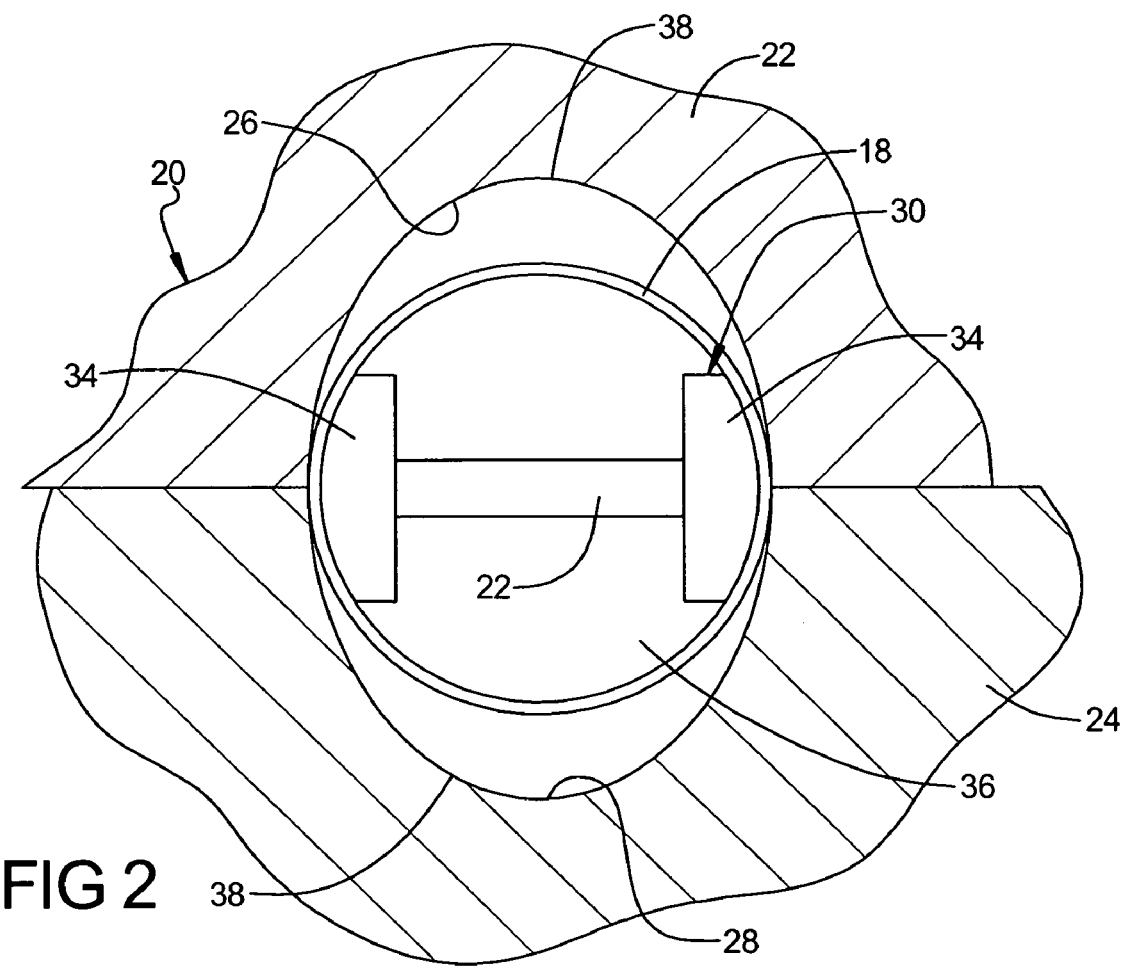
FIG. 2 is a fragmentary elevational view of a method, according to the present invention, of making the variable thickness tubular member of FIG. 1.

Referring to the drawings and in particular FIGS. 1 and 2, one embodiment of a variable thickness tubular member 10, according to the present invention, is generally shown for a vehicle (not shown). In the embodiment illustrated in FIG. 1, the variable thickness tubular member 10 extends axially and has a closed cross-section. In the embodiment illustrated, the variable thickness tubular member 10 is a tube having a generally non-circular cross-sectional shape. The variable thickness tubular member 10 has a generally arcuate shaped wall 12 forming a closed perimeter. The wall 12 has at least one, preferably a plurality of portions 14 having a thickness ($t_1$) greater than a thickness ($t_2$) of remaining portions 16 along the perimeter thereof to form the variable thickness tubular member 10. The thickness of the wall 12 varies between thicknesses ($t_1$) and ($t_2$). The variable thickness tubular member 10 is made of a metal material with good elongation properties such as mild steel or aluminum. The variable thickness tubular member 10 is formed by a method to be described. It should be appreciated that the variable thickness tubular member 10 is a monolithic structure being integral, unitary, and one-piece. It should also be appreciated that the variable thickness tubular member 10 may be defined as having a variable wall thickness with a closed non-circular cross-section.

Referring to FIG. 2, one embodiment of a method, according to the present invention, of making the variable thickness tubular member 10 is shown for assembly in automotive structures (not shown) of a vehicle (not shown). The method stretches a metal tubular member or blank 18 utilizing a "uniform stretching (strain) property" inherent in the metal material to achieve a thickness reduction where desired. In this embodiment, the tubular blank 18 is a circular tube having a uniform wall thickness. It should be appreciated that this may be accomplished with a "stretch forming process".

The method includes the step of forming the tubular blank 18 into a pre-formed or stretched member with a hydroforming operation as illustrated in FIG. 2. The tubular blank 18 is placed in a die set, generally indicated at 20, comprised of an upper die half 22 and a lower die half 24. The upper die half 22 includes a cavity portion 26 and the lower die half 24 includes a cavity portion 28 for receiving the tubular blank 18. The cavity portions 26 and 28 have a generally non-circular shape.

The method also includes the step of inserting a re-sizable mandrel, generally indicated at 30, inside of the tubular blank 18. The mandrel 30 has an extendable link 32 and a segment 34 at each end of the link 32. The segments 34 press the abutting interior surface of the tubular blank 18 against the adjacent walls of the die cavity portions 26 and 28 by extending the link 32. It should be appreciated that the mandrel 30 restrains the tubular blank 18 by contact friction between the mandrel 30, tubular blank 18, and die cavity walls.

The method includes the steps of sealing the ends of the tubular blank 18 and introducing hydraulic fluid into an interior 36 of the tubular blank 18 under pressure. The method also includes the steps of closing the die halves upon one another with the tubular blank 18 being tightly clamped between the die halves 22 and 24. During this closing of the die halves 22 and 24, a relatively constant hydraulic pressure may be maintained within the tubular blank 18 by incorporating a pressure relief valve (not shown) into the seal enclosing the ends of the tubular blank 18 so that hydraulic fluid may be forced from the tubular blank 18 as it collapses.

Once the die 20 is closed, the method includes the steps of increasing the fluid pressure and expanding the tubular blank 18 to a final cross-sectional profile by increasing the hydraulic pressure sufficient to exceed the yield limit of the tubular blank 18 so that the tubular blank 18 is forced into conformity with the cavity portions 26 and 28 of the die halves 22 and 24, respectively. The fluid is increased in pressure to cause the unsupported wall of the tubular blank 18 to stretch until it reaches portions 38 of the die cavity walls, which were previously not in contact. It should be appreciated that the stretching results in thickness reduction. It should also be appreciated that the wall portions of the tubular blank 18 in contact with the segments 34 of the mandrel 30 remain at their starting thickness.

The method includes the step of opening the die halves 22 and 24 to permit removal of the finished or variable thickness tubular member 10 from the die halves 22 and 24. The variable thickness tubular member 10 may be assembled into a vehicle body (not shown) or some other desired vehicle component. It should be appreciated that the resulting or variable thickness tubular member 10 is non-circular with an outer wall having the contour of the cavity portions 26 and 28 of the die 20.

Figure 3:
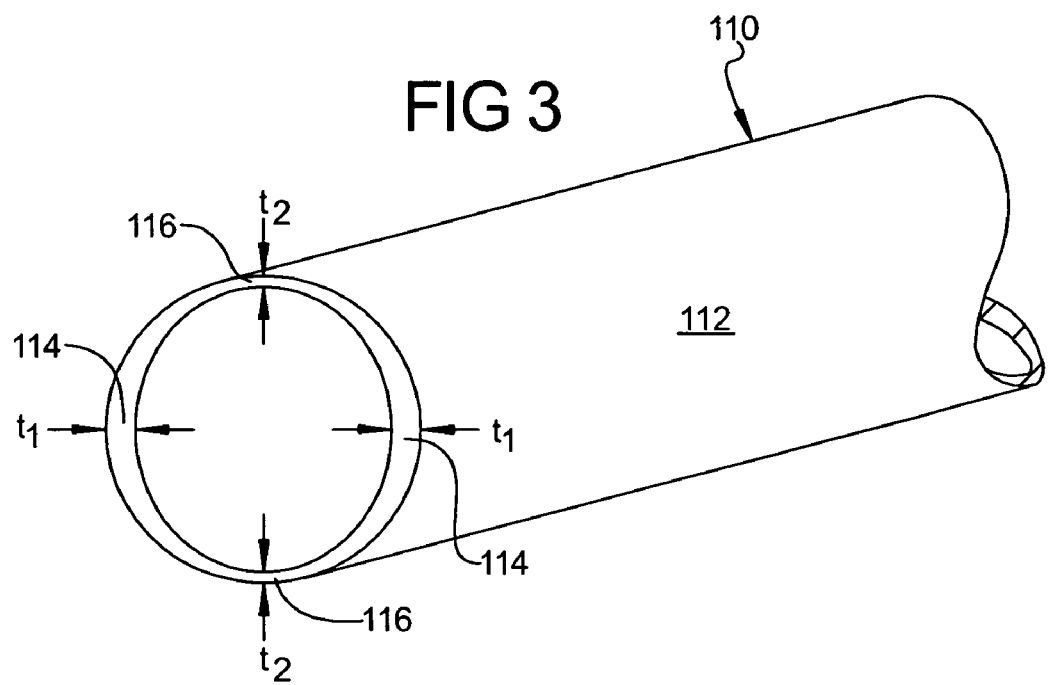
FIG. 3 is a perspective view of another embodiment of a variable thickness tubular member made by a method, according to the present invention.
Figure 4:
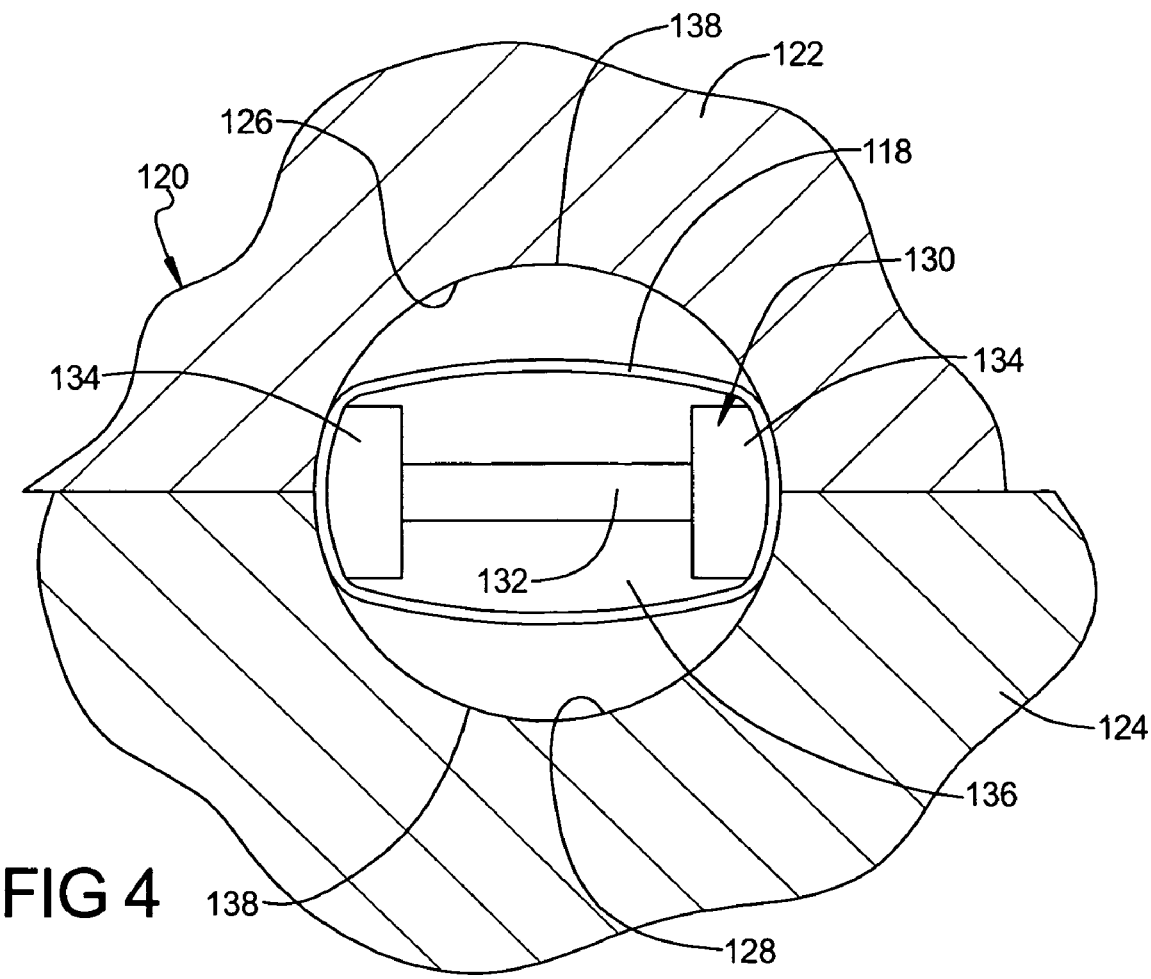
FIG. 4 is a fragmentary elevational view of another embodiment of a method, according to the present invention, of making the variable thickness tubular member of FIG. 3.

Referring to FIGS. 3 and 4, another embodiment, according to the present invention, of the variable thickness tubular member 10 and method of making same is shown. Like parts of the variable thickness tubular member 10 have like reference numerals increased by one hundred (100). In the embodiment illustrated in FIG. 3, the variable thickness tubular member 110 is a tube having a generally circular cross-sectional shape. The variable thickness tubular member 110 has a generally arcuate shaped wall 112 forming a closed perimeter. The wall 112 has at least one, preferably a plurality of portions 114 having a thickness ($t_1$) greater than a thickness ($t_2$) of remaining portions 116 along the perimeter thereof to form the variable thickness tubular member 110. The thickness of the wall 112 varies between thicknesses ($t_1$) and ($t_2$). The variable thickness tubular member 110 is made of a metal material with good elongation properties such as mild steel or aluminum. The variable thickness tubular member 110 is formed by a method to be described. It should be appreciated that the variable thickness tubular member 110 is a monolithic structure being integral, unitary, and one-piece. It should also be appreciated that the variable thickness tubular member 10 may be defined as having a variable wall thickness with a closed circular cross-section.

Referring to FIG. 4, another embodiment, according to the present invention, of the method of making the variable thickness tubular member 10 is shown. Like parts of the tubular blank 18 and die 20 have like reference numerals increased by 100. The method includes the step of forming a tubular blank 118 into a pre-formed or stretched member with a hydroforming operation as illustrated in FIG. 4. In this embodiment, the tubular blank 118 is a non-circular, preferably oval, tube having a uniform wall thickness. The tubular blank 118 is placed in a die set, generally indicated at 120, comprised of an upper die half 122 and a lower die half 124. The upper die half 122 includes a cavity portion 126 and the lower die half 124 includes a cavity portion 128 for receiving the tubular blank 118. The cavity portions 126 and 128 have a generally circular shape.

The method includes the step of inserting a re-sizable mandrel, generally indicated at 130, inside of the tubular blank 118. The mandrel 130 has an extendable link 132 and a segment 134 at each end of the link 132. The segments 134 press the abutting interior surface of the tubular blank 118 against the adjacent walls of the die cavity portions 126 and 128 by extending the link 132. It should be appreciated that the mandrel 130 restrains the tubular blank 118 by contact friction between the mandrel 130, tubular blank 118, and die cavity walls.

The method includes the steps of sealing the ends of the tubular blank 118 and introducing hydraulic fluid into an interior 136 of the tubular blank 118 under pressure. The method also includes the step of closing the die halves 122 and 124 upon one another with the tubular blank 118 being tightly clamped between the die halves 122 and 124.

Once the die 120 is closed, the method includes the steps of increasing the fluid pressure and expanding the tubular blank 118 to a final cross-sectional profile by increasing the hydraulic pressure sufficient to exceed the yield limit of the tubular blank 118 so that the tubular blank 118 is forced into conformity with the cavity portions 126 and 128 of the die halves 122 and 124, respectively. The fluid is increased in pressure to cause the unsupported wall of the tubular blank 118 to stretch until it reaches portions 138 of the die cavity walls, which were previously not in contact. It should be appreciated that the stretching results in thickness reduction. It should also be appreciated that the tube wall segments in contact with the segments 134 of the mandrel 130 remain at their starting thickness.

The method includes the step of opening the die halves 122 and 124 to permit removal of the finished or variable thickness tubular member 110 from the die halves 122 and 124. The variable thickness tubular member 110 may be assembled into a vehicle body (not shown) or some other desired vehicle component. It should be appreciated that the resulting or variable thickness tubular member 110 is circular with an outer wall having the contour of the circular cavity portions 126 and 128 of the die 120 to form a circular final cross-sectional form.

Figure 5:
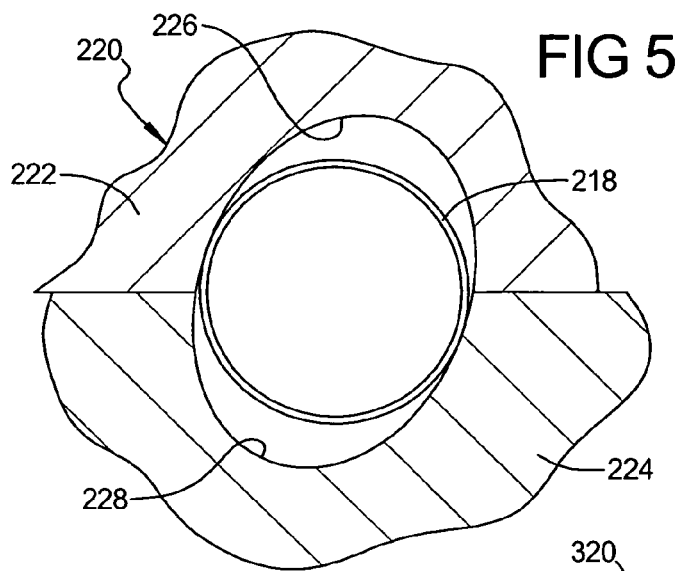
FIG. 5 is a fragmentary elevational view of yet another embodiment of a method of making a variable thickness tubular member, according to the present invention.

Referring to FIG. 5, yet another embodiment, according to the present invention, of the method of making the variable thickness tubular member 10. Like parts of the tubular blank 18 and die 20 have like reference numerals increased by 200. The method includes the step of forming a tubular blank 218 into a pre-formed or stretched member with a hydroforming operation. In this embodiment, the tubular blank 218 is a circular tube having a uniform wall thickness. The tubular blank 218 is placed in a die set, generally indicated at 220, comprised of an upper die half 222 and a lower die half 224. The upper die half 222 includes a cavity portion 226 and the lower die half 224 includes a cavity portion 228 for receiving the blank 218. The cavity portions 226 and 228 have a generally oval shape. The operation of the method is similar to that for the method of FIG. 2. It should be appreciated that the shape of the distribution of wall thickness change between t1 and t2 can be controlled by the cross-sectional shape of the cavity portions 226 and 228 of the die 220.

Figure 6:
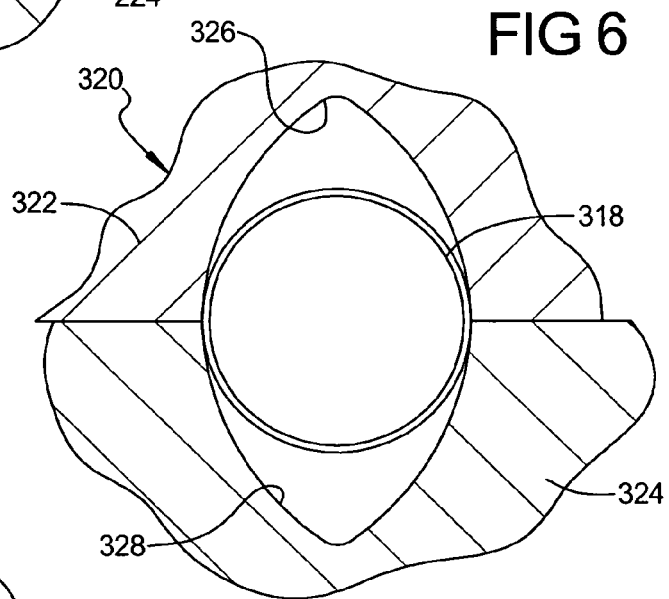
FIG. 6 is a fragmentary elevational view of still another embodiment of a method of making a variable thickness tubular member, according to the present invention.

Referring to FIG. 6, still another embodiment, according to the present invention, of the method of making the variable thickness tubular member 10. Like parts of the tubular blank 18 and die 20 have like reference numerals increased by 300. The method includes the step of forming a tubular blank 318 into a pre-formed or stretched member with a hydroforming operation. In this embodiment, the tubular blank 318 is a circular tube having a uniform wall thickness. The blank 318 is placed in a die set, generally indicated at 320, comprised of an upper die half 322 and a lower die half 324. The upper die half 322 includes a cavity portion 326 and the lower die half 324 includes a cavity portion 328 for receiving the blank 318. The cavity portions 326 and 328 have a generally football shape. The operation of the method is similar to that for the method of FIG. 2. It should be appreciated that the shape of the distribution of wall thickness change between t1 and t2 can be controlled by the cross-sectional shape of the cavity portions 326 and 328 of the die 320.

Figure 7:
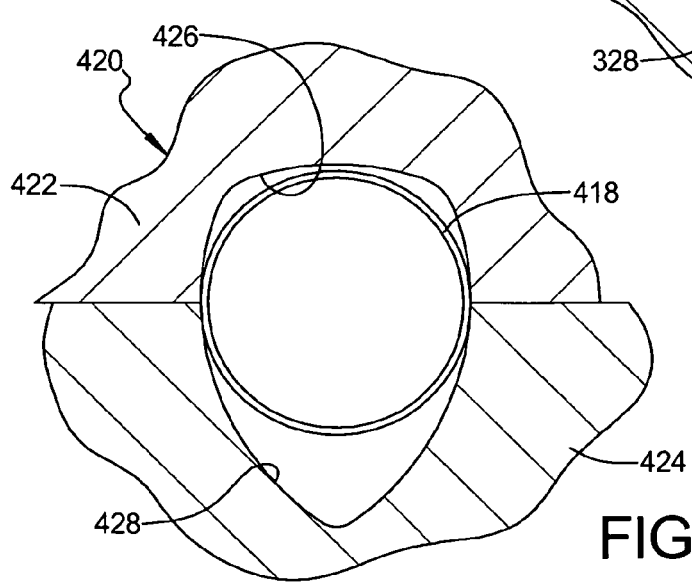
FIG. 7 is a fragmentary elevational view of a further embodiment of a method of making a variable thickness tubular member, according to the present invention.

Referring to FIG. 7, a further embodiment, according to the present invention, of the method of making the variable thickness tubular member 10. Like parts of the tubular blank 18 and die 20 have like reference numerals increased by 400. The method includes the step of forming a tubular blank 418 into a pre-formed or stretched member with a hydroforming operation. In this embodiment, the tubular blank 418 is a circular tube having a uniform wall thickness. The blank 418 is placed in a die set, generally indicated at 420, comprised of an upper die half 422 and a lower die half 424. The upper die half 422 includes a cavity portion 426 and the lower die half 424 includes a cavity portion 428 for receiving the blank 418. The cavity portions 426 and 428 have an unsymmetrical shape. The operation of the method is similar to that for the method of FIG. 2. It should be appreciated that unsymmetrical thickness distributions may be produced by the unsymmetrical cross-sectional shape of the cavity portions 426 and 428 of the die 420.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A method of making a variable thickness tubular member for a vehicle, said method comprising the steps of:
   providing a tubular member;
   positioning a mandrel inside of the tubular member; and;
   hydroforming the tubular member into a variable thickness tubular member having a variable wall thickness along its perimeter.

2. A method as set forth in claim 1 including the step of providing a die set having a first die half with a first cavity portion and a second die half with a second cavity portion to receive the tubular member.

3. A method as set forth in claim 2 including the step of placing the tubular blank between the first die half and second die half.

4. A method as set forth in claim 2 including the step of closing the first die half and the second die half together.

5. A method as set forth in claim 2 wherein the first die cavity and the second die cavity have a symmetrical shape.

6. A method as set forth in claim 2 wherein the first die cavity and the second die cavity have an unsymmetrical shape.

7. A method as set forth in claim 2 wherein the first die cavity and the second die cavity have a generally circular cross-sectional shape.

8. A method as set forth in claim 2 wherein the first die cavity and the second die cavity have a generally non-circular cross-sectional shape.

9. A method as set forth in claim 1 wherein the tubular member has a generally circular cross-sectional shape.

10. A method as set forth in claim 1 wherein the tubular member has a generally non-circular cross-sectional shape.

11. A method as set forth in claim 1 wherein the variable thickness tubular member has wall portions with a thickness less than a thickness of remaining wall portions.

12. A method of making a variable thickness tubular member for a vehicle, said method comprising the steps of:
    providing a tubular blank;
    providing a die set having a first die half with a first cavity portion and a second die half with a second cavity portion to receive the tubular blank;
    positioning a mandrel inside of the tubular blank;
    placing the tubular blank in the first cavity portion and the second cavity portion; and
    hydroforming the tubular blank into a tubular member having a variable wall thickness along its perimeter.

13. A method as set forth in claim 12 wherein the first die cavity and the second die cavity have a symmetrical shape.

14. A method as set forth in claim 12 wherein the first die cavity and the second die cavity have an unsymmetrical shape.

15. A method as set forth in claim 12 wherein the first die cavity and the second die cavity have a generally circular cross-sectional shape.

16. A method as set forth in claim 12 wherein the first die cavity and the second die cavity have a generally non-circular cross-sectional shape.

17. A method as set forth in claim 12 wherein the tubular blank has a generally circular cross-sectional shape.

18. A method as set forth in claim 12 wherein the tubular blank has a generally non-circular cross-sectional shape.

19. A method as set forth in claim 12 wherein the variable thickness tubular member has wall portions with a thickness less than a thickness of remaining wall portions.

* * * * *